(12) United States Patent
Inoue

(10) Patent No.: US 10,761,782 B2
(45) Date of Patent: *Sep. 1, 2020

(54) PRINTING APPARATUS, METHOD, AND STORAGE MEDIUM FOR UPDATING A CLIENT CERTIFICATE OF THE PRINTING APPARATUS

(71) Applicant: CANON KABUSHIKI KAISHA, Tokyo (JP)

(72) Inventor: Go Inoue, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/417,146

(22) Filed: May 20, 2019

(65) Prior Publication Data

US 2019/0361634 A1 Nov. 28, 2019

(30) Foreign Application Priority Data

May 24, 2018 (JP) .................... 2018-100074

(51) Int. Cl.
*G06F 3/12* (2006.01)

(52) U.S. Cl.
CPC .......... *G06F 3/1204* (2013.01); *G06F 3/1225* (2013.01); *G06F 3/1238* (2013.01); *G06F 3/1288* (2013.01)

(58) Field of Classification Search
CPC .... G06F 3/1204; G06F 3/1288; G06F 3/1238; G06F 3/1225; G06F 21/608; G06F 3/1224; G06F 3/123; H04N 2201/0094
See application file for complete search history.

(56) References Cited

U.S. PATENT DOCUMENTS

| | | | | |
|---|---|---|---|---|
| 2012/0233458 A1* | 9/2012 | Sugano | ................ | H04L 9/0891 713/158 |
| 2012/0233702 A1* | 9/2012 | Matsuda | ............... | G06F 21/608 726/26 |
| 2013/0057895 A1* | 3/2013 | Okazawa | .............. | H04L 9/3263 358/1.14 |
| 2013/0227276 A1* | 8/2013 | Nakajima | ............. | H04L 9/3263 713/156 |
| 2019/0361632 A1* | 11/2019 | Hosoda | ................. | G06F 3/1204 |

FOREIGN PATENT DOCUMENTS

JP 2013041552 A 2/2013

* cited by examiner

*Primary Examiner* — Kent Yip
(74) *Attorney, Agent, or Firm* — Canon U.S.A., Inc. IP Division

(57) ABSTRACT

A printing apparatus stores a user credential and updates a certificate by using the stored user credential information to reduce the time and effort required by a user to update the certificate.

11 Claims, 19 Drawing Sheets

FIG.10
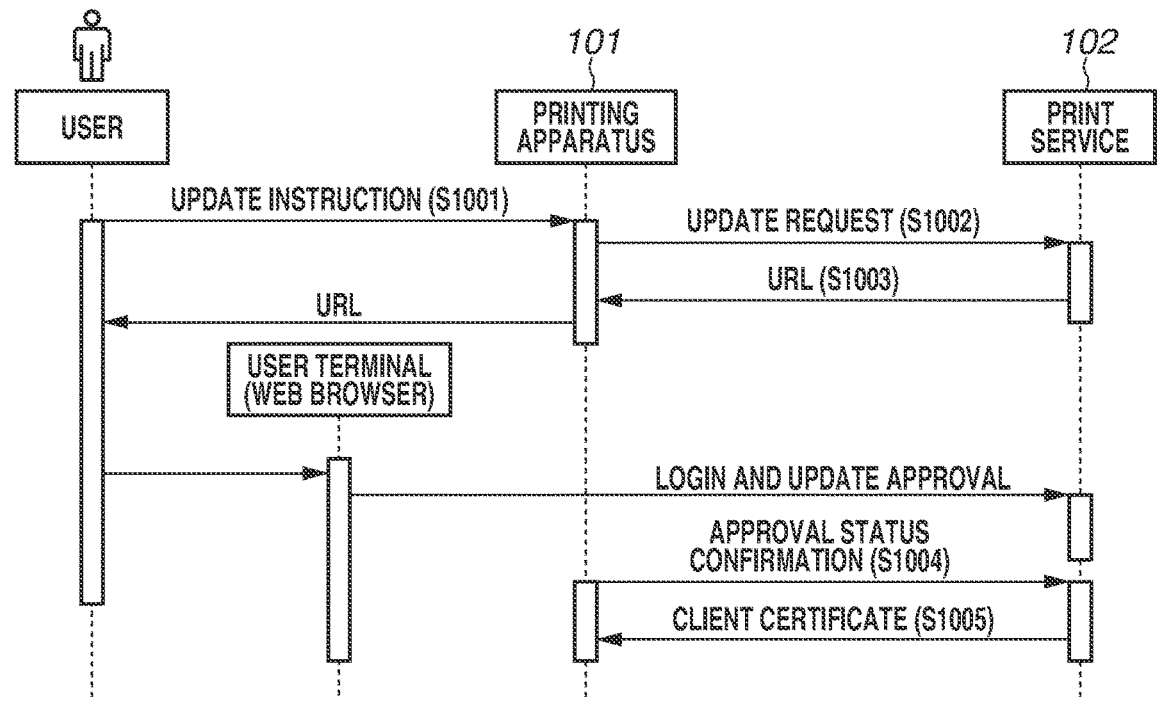
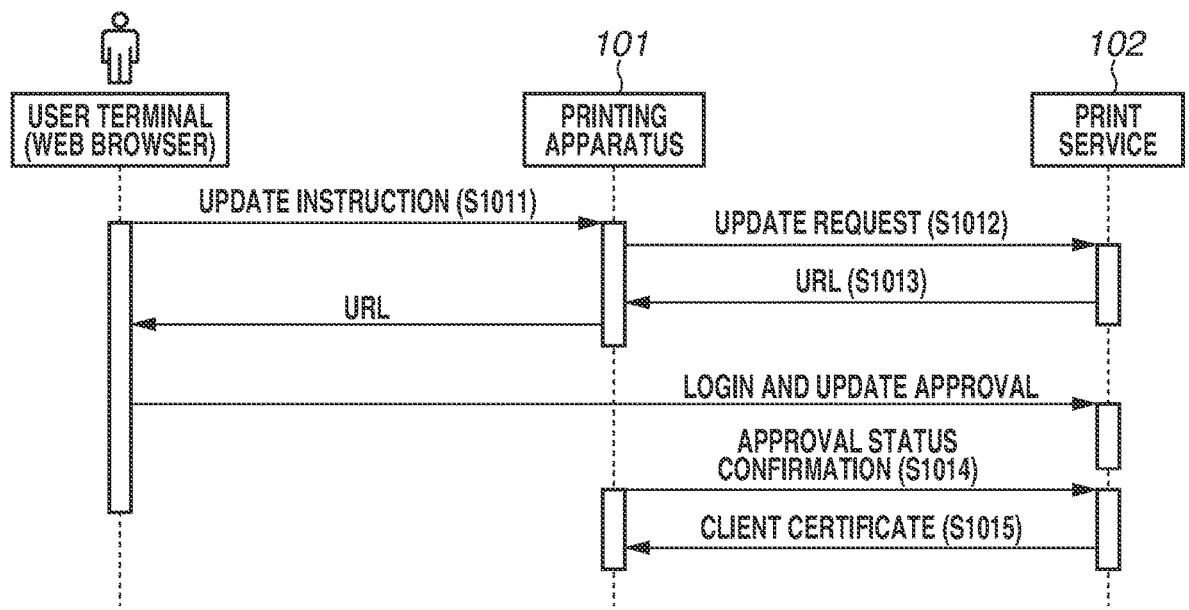

FIG. 14

To: printeradmin@conon.jp
From: printer101@conon.jp
Subject: AUTOMATIC UPDATE OF CLIENT CERTIFICATE FOR CLOUD PRINTER (PRINTING APPARATUS) HAS FAILED

BODY TEXT

1401 — AUTOMATIC UPDATE OF CERTIFICATE FOR THE FOLLOWING CLOUD PRINTER HAS FAILED.
IF EXPIRATION DATE EXPIRES, CLOUD PRINT IS DISABLED.
PRINTER NAME: PRINTING APPARATUS 101
SERIAL NUMBER: ABC12345

1402 — EXPIRATION DATE: JANUARY 20, 2020

[UPDATE PROCEDURE]
PERFORM UPDATE PROCESSING WITH ONE OF THE FOLLOWING METHODS:

1403 — UPDATE METHOD 1
DISPLAY CLOUD PRINT SETTING SCREEN FROM LOCAL UI OF PRINTING APPARATUS, SELECT MANUAL UPDATE METHOD, AND PRESS UPDATE BUTTON.

1404 — UPDATE METHOD 2
SELECT MANUAL UPDATE METHOD FROM THE FOLLOWING REMOTE UI SITE OF PRINTING APPARATUS AND PRESS UPDATE BUTTON. ACCESS SITE AND PRESS UPDATE BUTTON.
http://printer101/cloudprintsetting 1405 — UPDATE METHOD 3
UPDATE OPERATION CAN BE PERFORMED FROM THE FOLLOWING CLOUD PRINT SITE.
http://cloudprint/printer101

FIG.15

| PRINTER NAME | EXPIRATION DATE | | | |
|---|---|---|---|---|
| PRINTING APPARATUS 101 | JANUARY 20, 2020 | UPDATE | DELETE | DOWNLOAD CERTIFICATE |
| PRINTING APPARATUS 104 | JANUARY 20, 2025 | UPDATE | DELETE | DOWNLOAD CERTIFICATE |

FIG.17
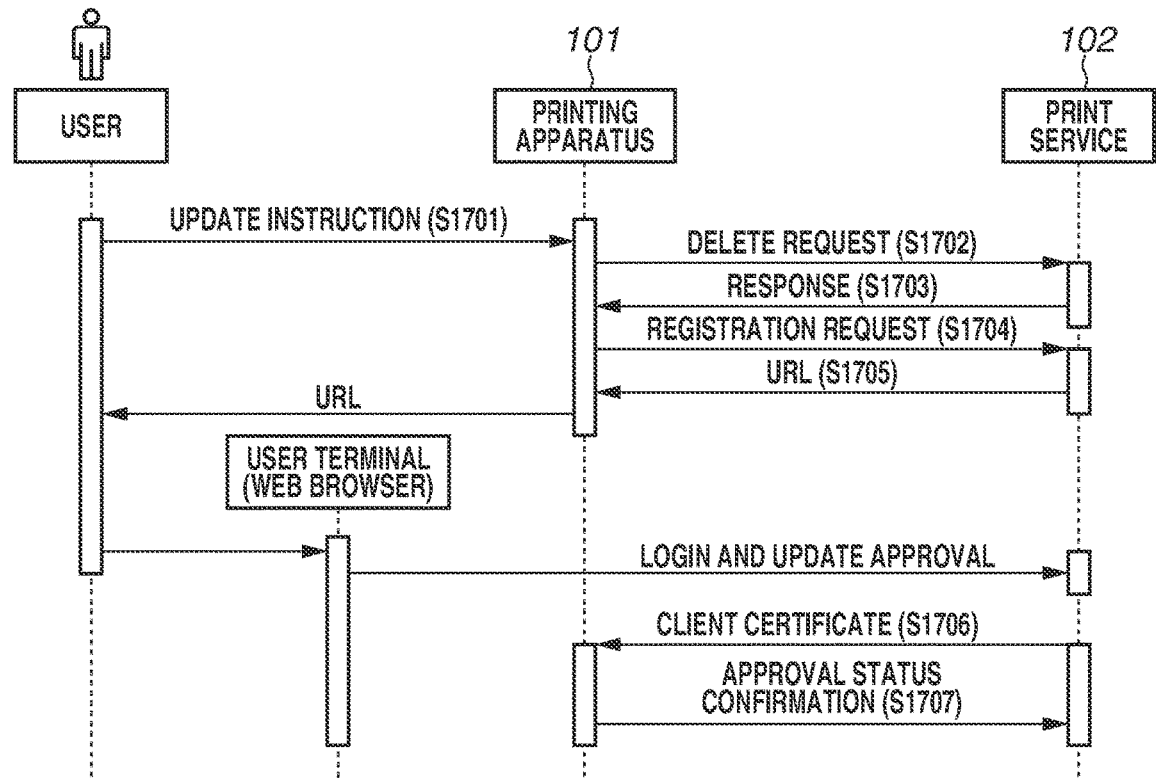
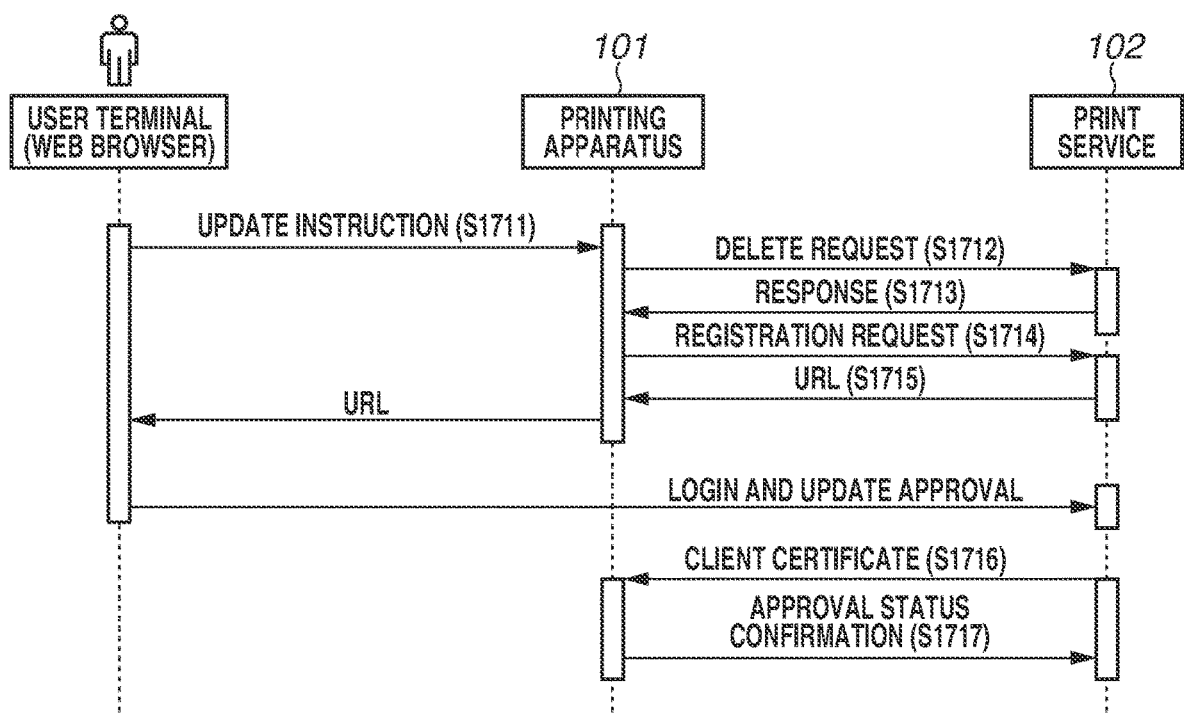

PRINTING APPARATUS, METHOD, AND STORAGE MEDIUM FOR UPDATING A CLIENT CERTIFICATE OF THE PRINTING APPARATUS

BACKGROUND OF THE INVENTION

Field of the Invention

The present invention relates to a printing apparatus supporting a cloud print service, a method, and a storage medium.

Description of the Related Art

In recent years, cloud print services have been known. In a known cloud print service, a printing apparatus is registered to a print service provided by a server on the Internet. The printing apparatus receives, via a cloud service, a print job output through an instruction from a client and performs printing. In order for the printing apparatus to cooperate with the cloud print service, the printing apparatus needs to be provided with a mechanism for cooperating with the cloud print service.

When registering a printing apparatus to the cloud print service, the owner of the printing apparatus needs to perform operations for issuing a request for registering the printing apparatus to the cloud print service, via the printing apparatus, logging in to the cloud print service by using a web browser of the client, and permitting the registration of the printing apparatus.

It is known that, when the printing apparatus uses a cloud service, a client certificate is used to prove the printing apparatus. The client certificate is used by the cloud service to authenticate the printing apparatus in communication with the cloud service (Japanese Patent Application Laid-Open No. 2013-41552).

SUMMARY OF THE INVENTION

According to embodiments of the present invention, a printing apparatus for performing printing upon reception of print data from a print service for providing a service via the Internet includes an acquisition unit configured to acquire a client certificate of the printing apparatus issued by the print service at the time of registering the printing apparatus upon transmission of a request for registering the printing apparatus to the print service, and a user credential of a user who has issued an instruction for registering the printing apparatus, a printing unit configured to transmit the client certificate to the print service, receive the print data after the print service has performed authentication based on the client certificate, and perform printing, a transmission unit configured to, in a case where the client certificate is determined to be scheduled to be invalidated in a case where an expiration date described in the client certificate expires, transmit a request for updating the client certificate to the print service by using the user credential, and an update unit configured to receive the client certificate newly issued in a case where the update request is transmitted by the transmission unit and the user credential is successfully verified by the print service, and update the old client certificate to the newly issued client certificate.

Further features of the present invention will become apparent from the following description of exemplary embodiments with reference to the attached drawings.

BRIEF DESCRIPTION OF THE DRAWINGS

FIG. 10 illustrates a sequence for manually updating a client certificate.

FIG. 14 illustrates an example of a text for a mail notification when update fails.

FIG. 15 illustrates a user interface of a print service for performing printer management.

FIG. 17 illustrates a sequence for manually updating the client certificate according to a second exemplary embodiment.

DESCRIPTION OF THE EMBODIMENTS

Communication using a client certificate can also be considered in cooperation between a cloud print service and a printing apparatus. However, there is an expiration date for the client certificate. When the expiration date expires, the printing apparatus cannot be authenticated and therefore becomes unable to use the cloud print service. Therefore, the owner user of the printing apparatus who performed an operation for issuing the client certificate needs to perform, at a timing when the client certificate is determined to be scheduled to be invalidated, an update operation equivalent to the issuance operation. There has been an issue that these operations are troublesome.

Embodiments of the present invention are directed to solving the above-described issue. More specifically, embodiments of the present invention are directed to reducing the time and effort required by a user to update a client certificate by providing the user with a method for more conveniently updating the client certificate of a printing apparatus registered to a cloud print service.

Exemplary embodiments for embodying the present invention will be described below with reference to the accompanying drawings.

Figure 1:
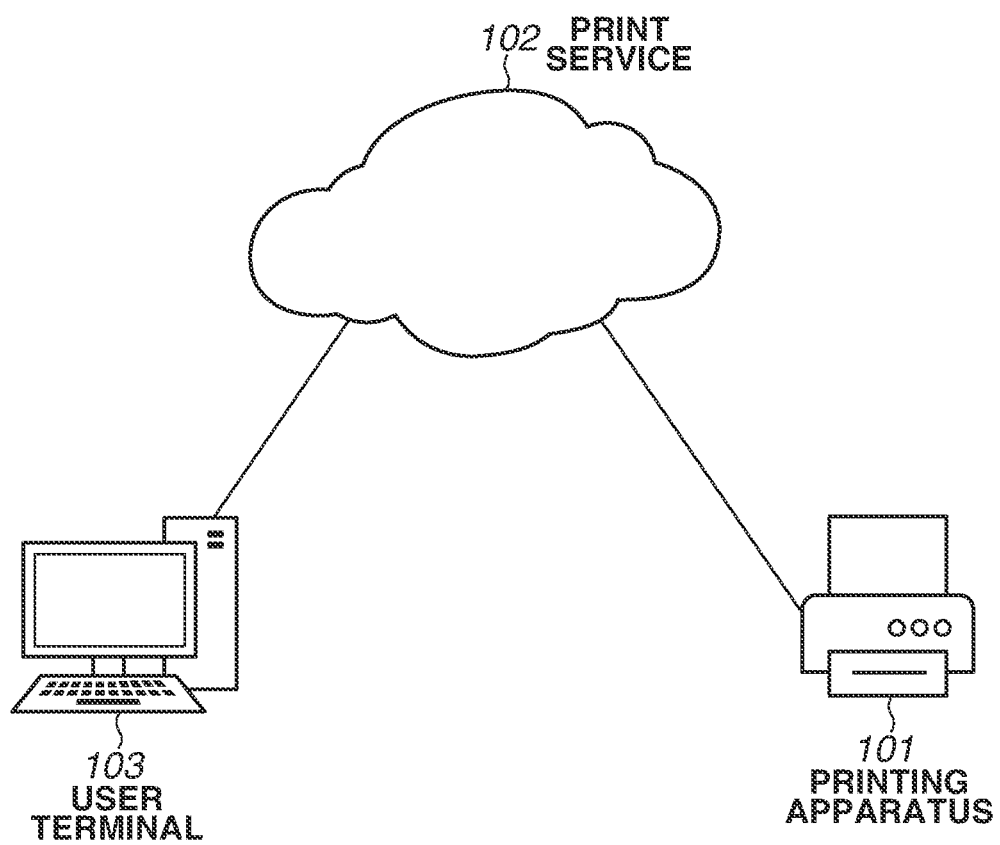
FIG. 1 illustrates a system configuration according to an exemplary embodiment.

A first exemplary embodiment will be described below. FIG. 1 illustrates a configuration of a print system including a printing apparatus according to embodiments of the present invention. The print system includes a printing apparatus 101 according to embodiments of the present invention, a print service 102 provided on the Internet, and a user terminal 103. The printing apparatus 101 is pre-registered to the print service 102 by the owner of the printing apparatus 101. The user selects the printing apparatus 101 registered to the print service 102 from the user terminal 103 and transmits print data to the print service 102. The printing apparatus 101 receives, via the print service 102, the print data transmitted by the user and performs printing. Although not illustrated, the user can use the print service 102 from not only the user terminal 103 but also a plurality of user terminals such as a general-purpose personal computer and a smart phone. The printing apparatus 101 and the user terminal 103 are connected with the print service 102 via the Internet.

<Hardware Configuration of Printing Apparatus>

Figure 2:
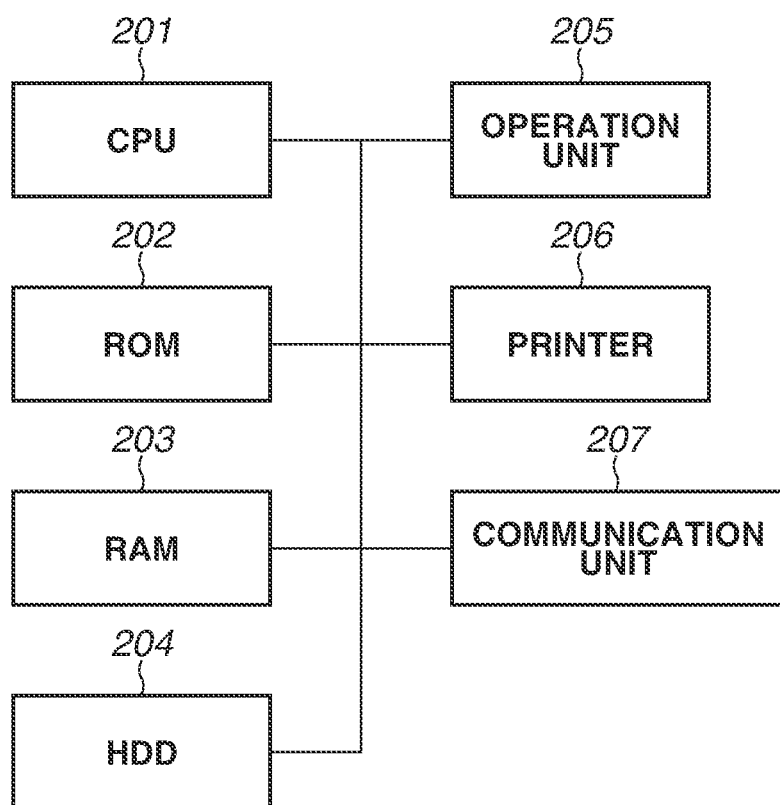
FIG. 2 illustrates a hardware configuration of a printing apparatus.

FIG. 2 is a simplified view illustrating a hardware configuration of the printing apparatus 101. A central processing unit (CPU) 201 is a processor for controlling operations of the entire multifunction peripheral. A random access memory (RAM) 203 is a volatile memory used as a work area and a temporary storage area for loading various control programs stored in a read only memory (ROM) 202 and a hard disk drive (HDD) 204.

The read only memory (ROM) 202 is a nonvolatile memory for storing the boot program of the multifunction peripheral. The HDD 204 is a nonvolatile hard disk having a larger capacity than the RAM 203. The HDD 204 stores control programs for the multifunction peripheral. The HDD 204 also stores an operating system (OS) and application programs.

When the multifunction peripheral is activated, the CPU 201 executes the boot program stored in the ROM 202. The boot program reads a program of the OS stored in the HDD 204 and loads the program into the RAM 203. After execution of the boot program, the CPU 201 subsequently executes the program of the OS loaded into the RAM 203 to control the multifunction peripheral. The CPU 201 also stores data to be used for operations of the control program in the RAM 203 and reads and writes the data.

Although, in the multifunction peripheral, one CPU 201 performs each piece of processing illustrated in a flowchart (described below), other modes are applicable. For example, a plurality of CPUs or microprocessors (MPUs) may perform each piece of processing illustrated in the flowchart (described below). A part of the processing (described below) may be performed by using a hardware circuit such as an application specific integrated circuit (ASIC) or a field-Programmable gate array (FPGA).

The operation unit 205 is a touch-operable display. A printer 206 is a printer engine for printing print data received from the outside via a communication unit 207. The communication unit 207 is a network interface for connecting with the Internet and a Local Area Network (LAN) in an office. The user terminal 103 and the print service 102 also include a similar hardware configuration including the CPU 201, the ROM 202, the RAM 203, and the HDD 204.

<Software Configuration>

Figure 3:
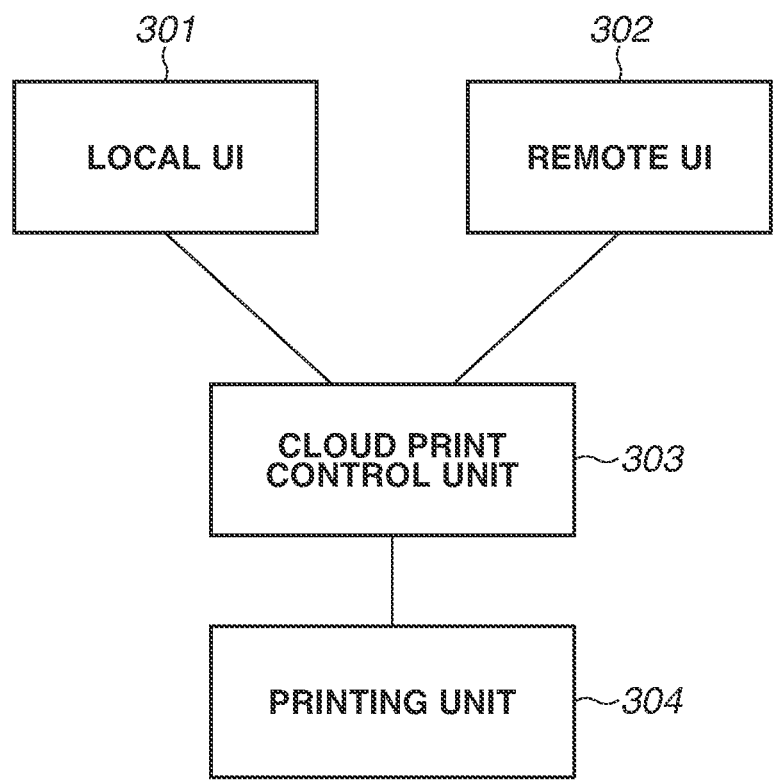
FIG. 3 illustrates a software configuration of the printing apparatus.

FIG. 3 is a simplified view illustrating a software configuration of the printing apparatus 101. The software configuration is implemented when the CPU 201 loads a program stored in the ROM 202 into the RAM 203 and executes the program. A local user interface (UI) 301 provides a user interface for enabling the user to change the settings and to use the functions of the printing apparatus 101 via the display of the operation unit 205. A remote UI 302 has a Hypertext Transfer Protocol (HTTP) server function and provides the user with a user interface configured in HyperText Markup Language (HTML). The user can access the remote UI 302 by using a web browser of the user terminal 103 to change the settings and to use the functions of the printing apparatus 101.

A cloud print control unit 303 is a software module for implementing communication protocols and functions for supporting the print service 102. A printing unit 304 receives print data received from the print service 102 by the cloud print control unit 303 and controls the printer 206 to perform print processing. A user authentication unit (not illustrated) is a software module for authenticating the user using the local UI 301 and the remote UI 302.

The accounts of an administrator and general users can be registered in the HDD 204 via user interfaces of the local UI 301 and the remote UI 302. A user name, password, role (administrator/general user), and mail address can be registered as account information in the HDD 204. The user authentication unit acquires a user name and password from a login screen displayed in the local UI 301 or the remote UI 302 and compares these pieces of information with the account information registered in the HDD 204 to perform user authentication. When the user authentication is successfully completed, the user authentication unit enables the successfully authenticated user to log in to the printing apparatus 101. More specifically, the user authentication unit instructs the local UI 301 or the remote UI 302 to close the login screen and change the screen display to a menu screen. The user authentication unit also transmits user information (user name, role, and mail address) about the user who has logged in to the cloud print control unit 303 and other software modules.

Although not illustrated, the user terminal 103 is provided with a web browser for transmitting an HTML request, receiving HTML format data as a response, and displaying a screen based on the HTML format data. The print service 102 has a function of registering the printing apparatuses 101, and a function of converting print data specified to be printed from the user terminal 103 into a print job and providing the print job to the printing apparatus 101 selected from among a plurality of the registered printing apparatuses 101. These functions are also provided by the software configuration which is implemented when the CPU 201 loads a program stored in the ROM 202 into the RAM 203 and executes the program.

Figure 4:
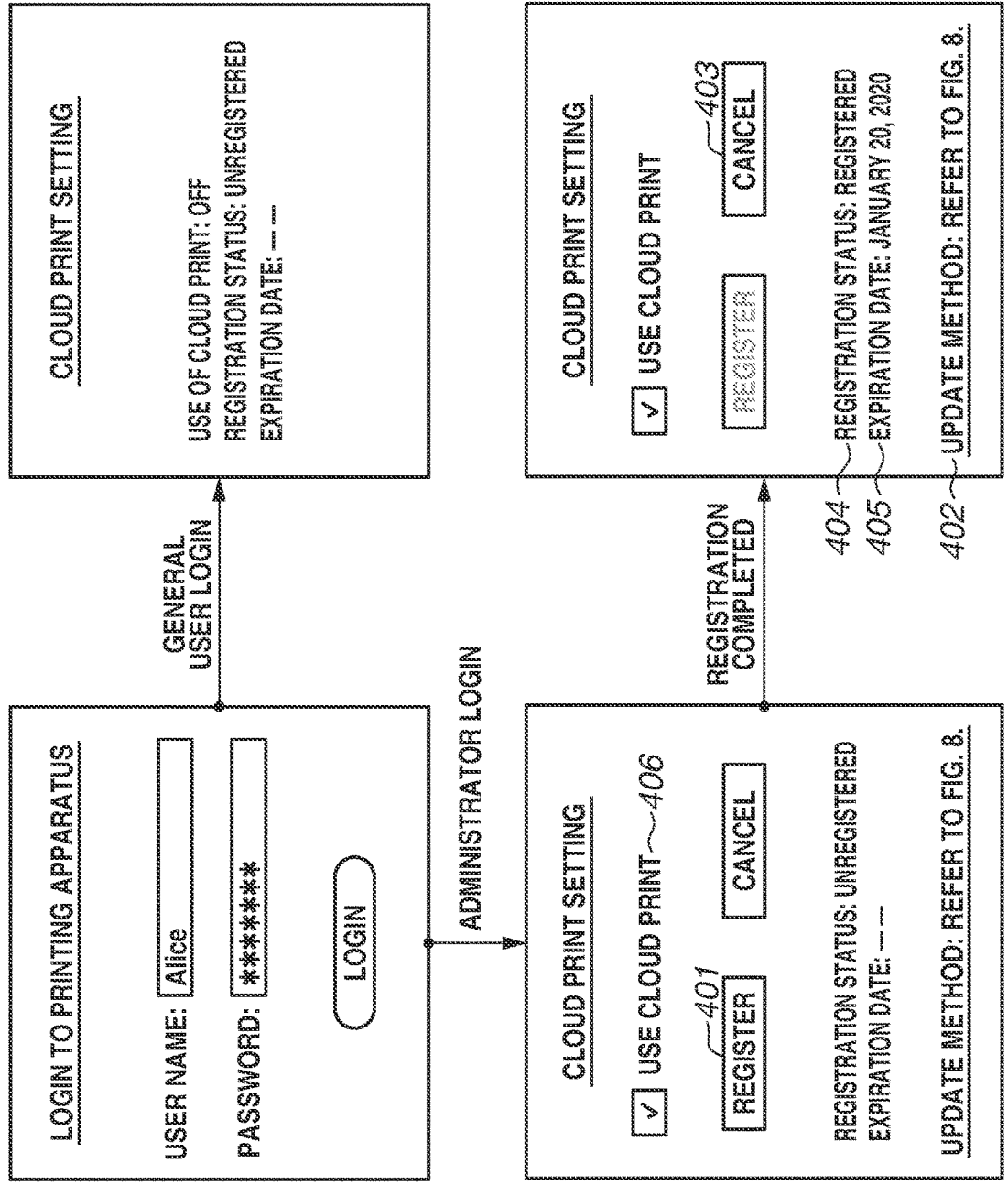
FIG. 4 illustrates a user interface for cloud print setting included in the printing apparatus.

The local UI 301 and the remote UI 302 provide user interfaces for enabling the user to register the printing apparatus 101 to the print service 102, update the registration, and cancel the registration. Such user interface is illustrated in FIG. 4. The user interface illustrated in FIG. 4 is provided by both the local UI 301 and the remote UI 302, and the owner of the printing apparatus 101 and the administrator can perform operations from either UI. The user interface includes a button 401 for performing processing for registering the printing apparatus 101 to the print service 102.

The user interface of the cloud print setting screen illustrated in FIG. 4 is provided only when the administrator logs in to the printing apparatus 101 from the login screen displayed in the local UI 301 or the remote UI 302. When a general user logs in to the printing apparatus 101, the cloud print setting items can only be referenced. The user interface includes a check box 406 for enabling the user to select whether to use the cloud print. The selected state of the check box 406 is stored in the HDD 204 as a setting. The user using the cloud print checks the check box 406 and then performs an operation for registering the printing apparatus 101 to the print service 102.

Figure 8:
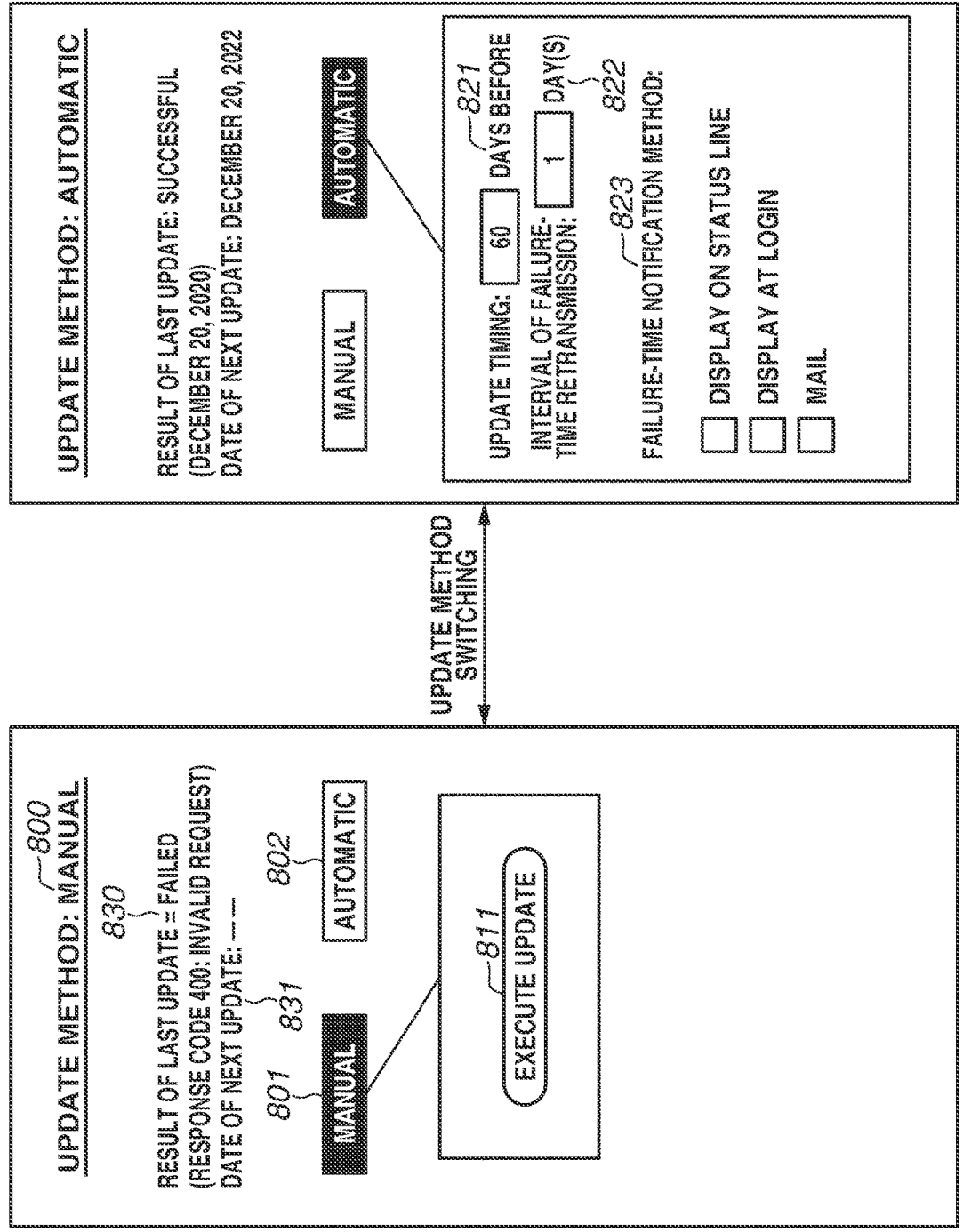
FIG. 8 illustrates a user interface for update setting included in the printing apparatus.

The user interface includes a button 402 for changing the screen display to the screen illustrated in FIG. 8 for updating the client certificate. The button 402 may be replaced with an EXECUTE UPDATE button 811 (described below). In this case, the user manually updates the client certificate. The user interface includes a button 403 for canceling the registration of the printing apparatus 101 once registered in the registration processing flow. Upon depression of this button, the printing apparatus 101 transmits a cancel request to the print service 102. The registration processing flow will be described below based on a case where the local UI 301 is used and a case where the remote UI 302 is used, with reference to the sequence diagrams illustrated in FIG. 5.

<Flow of Printing Apparatus Registration from Local UI 301>

The user logs in to the printing apparatus 101 from the local UI 301 and displays the cloud print setting screen illustrated in FIG. 4. In step S501, the user presses the REGISTER button 401 to issue a registration instruction to the printing apparatus 101. Upon detection of the instruction, the cloud print control unit 303 of the printing apparatus 101 generates a pair of a public key and a secret key to generate a Certificate Signing Request (CSR). The CSR refers to a message format of a certificate signature request transmitted from an applicant to a certificate authority in order to apply for a public key certificate. The CSR includes information for identifying the applicant and the generated public key. Information for identifying the applicant to be included in the CSR includes a common name, organization name, department name, address, and nation number.

With respect to the printing apparatus 101, a printer name "Printing Apparatus 101" is used as a common name. With respect to the organization name, department name, address, and nation number, default values prestored at the time of shipment are used for the printing apparatus 101. In step S502, the printing apparatus 101 transmits a registration request, together with the CSR, to the print service 102. The registration request includes information about the configuration of the printing apparatus 101, for example, the printer name, model name, attachment unit, and information about the printing capability such as monochrome/color, of the printing apparatus 101. Upon reception of the registration request, then in step S503, the print service 102 generates a uniform resource locator (URL) for registration to the printing apparatus 101 and returns the URL to the printing apparatus 101 as a response to the registration request. At this timing, the printing apparatus 101 has not yet been registered in the print service 102. When the print service 102 receives the printer registration from the printing apparatus 101, the print service 102 issues a client certificate (described below).

The client certificate to be issued to the printing apparatus 101 includes the following information in Table 1.

TABLE 1

| Item | Value |
| --- | --- |
| Version | V3 |
| Serial No. | 123456789 |
| Issuer | CN = Print service 102 |
| User identifier | CN = Printing apparatus 101 |

TABLE 1-continued

| Item | Value |
| --- | --- |
| Start of expiration date | Jan. 20, 2018 |
| End of expiration date | Jan. 20, 2020 |
| Public key | 30 82 01 0a 02 . . . |
| Signature algorithm | SHA256-RSA |
| Signature | 36 79 ca 35 66 87 72 . . . |

"Version" indicates the version of the X509 format of the client certificate. "Serial number" indicates the serial number to be supplied to the client certificate issued by the print service 102. "Issuer" indicates the identifier of the print service 102 which issues the client certificate. "User identifier" indicates the identifier of the printing apparatus 101 which requests the issuance of the client certificate. "Start of expiration date" indicates the date when the client certificate starts being used. "End of expiration date" indicates the date when the use period of the client certificate expires. In the following descriptions, the end of expiration date is simply referred to as an expiration date. "Public key" indicates the public key included in the CSR by the printing apparatus 101. "Signature algorithm" is the algorithm of the signature of the client certificate. "Signature" indicates the digital signature supplied by the print service 102 which issues the client certificate. The signature is signed by using the secret key included in the print service 102.

Although the first exemplary embodiment is described below centering on an example case where the print service 102 has a function of issuing a certificate, the print service 102 may issue a certificate by using a third party's certificate issuance service. When the print service 102 uses a third party's certificate issuance service, the identifier and signature of the issuer belong to the third party's certificate issuance service.

The printing apparatus 101 displays the received URL at the local UI 301 and prompts the user to access the URL for registering the printing apparatus 101. A Quick Response (QR) code (registered trademark) encoded from the URL may be displayed and red by a camera such as a smart phone. The printing apparatus 101 may instruct the printing unit 304 to print the URL or the QR code on paper.

Figure 6:
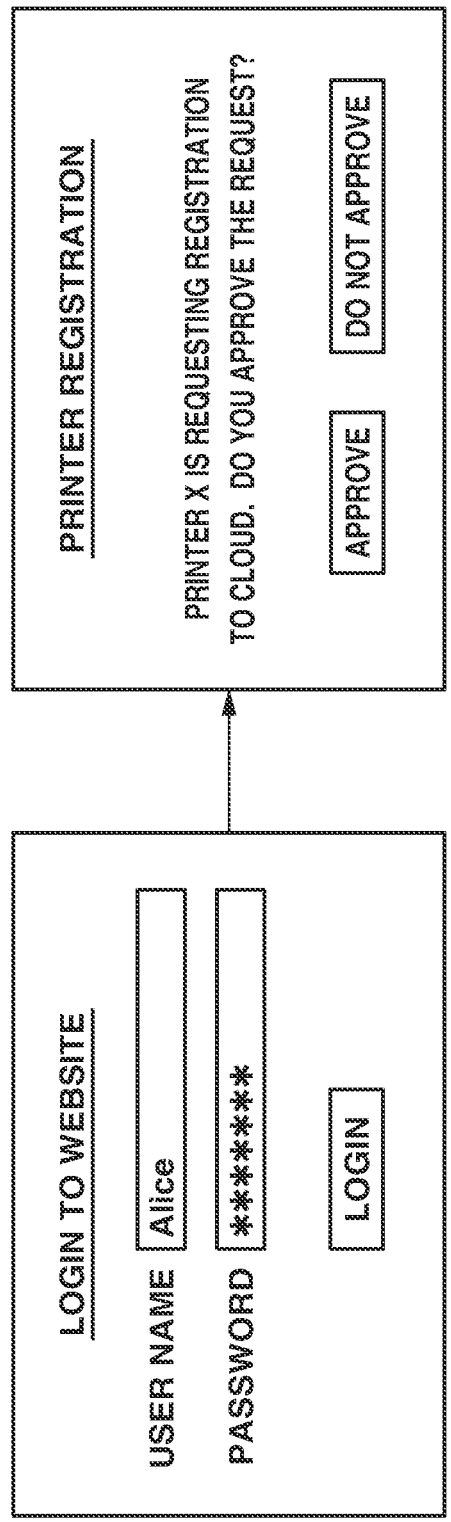
FIG. 6 illustrates a user interface of the print service for approving registration.

The user accesses the above-described URL by using a web browser of the user terminal 103. FIG. 6 illustrates an example of an interface on a website when the user accesses the URL by using a web browser of the user terminal 103. When the user accesses the URL, the user is prompted to log in to the website. When the user inputs a login account of the website and logs in to the website, a user interface for requesting approval for registration of the printing apparatus 101 appears.

In step S504, the printing apparatus 101 periodically accesses the print service 102 to confirm the status of registration approval. If registration approval has been made in the user interface illustrated in FIG. 6, then in step S505, the print service 102 returns the client certificate in the X509 format issued for the printing apparatus 101 to the printing apparatus 101. The printing apparatus 101 starts the confirmation of the status of registration approval after step S503 and repetitively performs the confirmation until the client certificate is successfully acquired, a notification that approval has been canceled is received from the print service 102, or a predetermined time period has elapsed.

When the client certificate is successfully received, the cloud print control unit 303 of the printing apparatus 101 stores the client certificate in the HDD 204. The cloud print control unit 303 also stores a registration status 404 of the printing apparatus 101 as "REGISTERED" and completes the registration processing. When displaying the user interface illustrated in FIG. 4, the cloud print control unit 303 acquires the expiration date described in the client certificate and displays the expiration date as an expiration date 405 of the cloud print. When the printing apparatus 101 receives a registration instruction in step S501, the cloud print control unit 303 acquires the user name and mail address of the current login user, from the user authentication unit and temporarily stores these pieces of information. After completion of the registration processing, the cloud print control unit 303 stores the above-described user name and mail address in the HDD 204 as registrant's information.

After completion of the registration processing, then in step S506, the print service 102 returns the user credential of the user who has performed registration approval to the printing apparatus 101. Examples of user credential include the hash value generated based on the account and password when the user accesses an URL. In addition, the user credential may be an identifier originally issued by the print service 102. The format of the user credential is not limited as long as the data uniquely identifies the user. Upon reception of the user credential, the user authentication unit stores the information in the HDD 204.

<Flow of Printing Apparatus Registration from Remote UI 302>

When the user uses the remote UI 302, the user logs in to the printing apparatus 101 from the remote UI 302 and displays the cloud print setting screen (FIG. 4) generated in HTML. In step S511, the user presses the REGISTER button 401 to issue a registration instruction to the printing apparatus 101. Upon detection of the instruction, the cloud print control unit 303 of the printing apparatus 101 generates a pair of a public key and a secret key to generate a CSR. In step S512, the printing apparatus 101 transmits a registration request, together with the CSR, to the print service 102. Upon reception of the registration request, then in step S513, the print service 102 generates a URL for registration of the printing apparatus 101 and returns the URL to the printing apparatus 101.

The printing apparatus 101 provides the web browser of the user terminal 103 with a link of the URL acquired from the print service 102 in HTML. The printing apparatus 101 may transmit a redirection request to the user terminal 103 so that the web browser of the user terminal 103 may be redirected to the URL acquired from the remote UI, without displaying the user link button on the screen displayed on the web browser and prompting the user to press the button. Operations of the printing apparatus 101 in steps S514, S515, and S516 are similar to the operations in steps S504, S505, and S506, respectively.

<Printing Flow>

Figure 7:
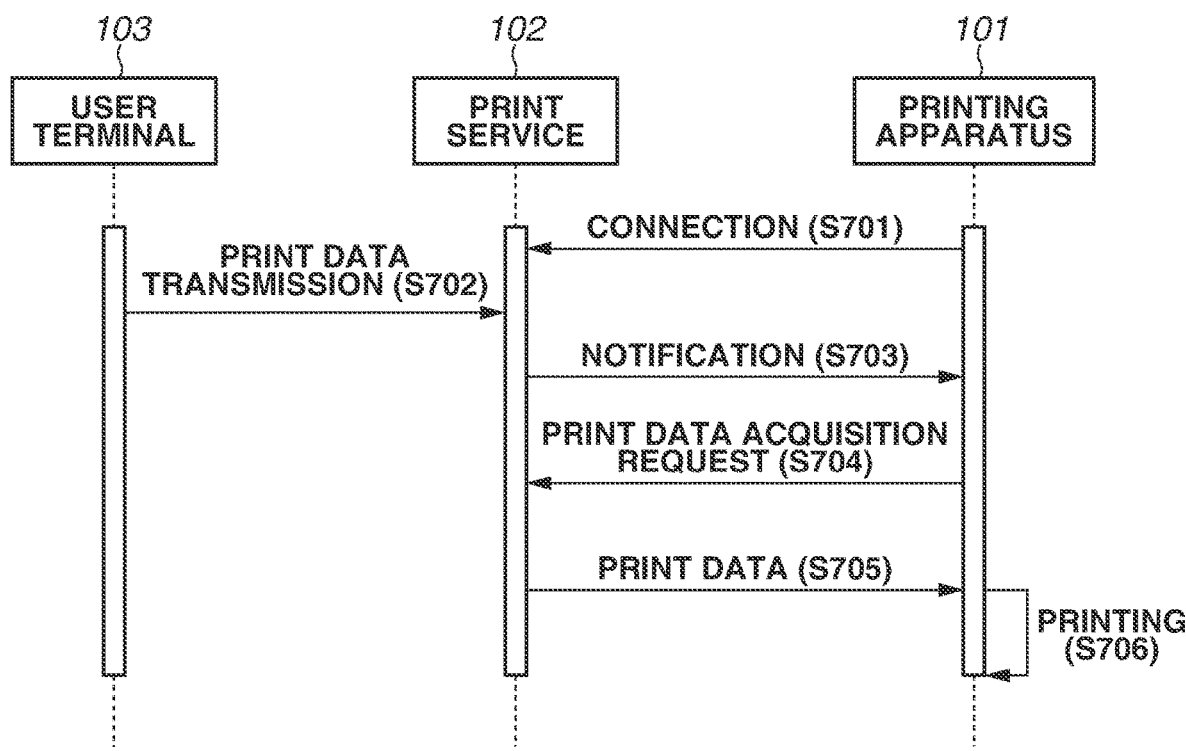
FIG. 7 illustrates a printing sequence.

The following describes the flow when the user performs printing on the printing apparatus 101 from the user terminal 103 via the print service 102, with reference to the sequence diagram illustrated in FIG. 7. In step S701, the cloud print control unit 303 of the printing apparatus 101 detects that the cloud print function is enabled and connects to the print service 102. When the check box 406 illustrated in FIG. 4 is selected and the registration status 404 is "REGISTERED", the cloud print control unit 303 determines that the cloud print function is enabled. In other conditions, the cloud print control unit 303 determines that the cloud print function is disabled. When connecting to the print service 102, the printing apparatus 101 presents the client certificate to the print service 102, and the client certificate is authenticated by the print service 102. More specifically, the print service 102 verifies the digital signature supplied to the client certificate to confirm that the client certificate is a regular certificate. The print service 102 also attempts to decrypt an encrypted message (included in processing in step S701) by using the public key of the printing apparatus 101 included in the client certificate. When the message can be correctly decrypted, the print service 102 confirms that the client is a regular client who owns the secret key of the printing apparatus 101, to authenticate the client.

In step S702, the user specifies the printing apparatus 101 registered in the print service 102 and transmits print data to the print service 102, from the user terminal 103. For example, a web browser supporting the print service 102 is installed in the user terminal 103. The user can select a printing apparatus registered in the print service 102 from a printing menu in the web browser.

In step S703, the print service 102 generates a print job after receiving the print data from the user terminal 103 and notifies the printing apparatus 101 of the existence of a print job via the connection established in step S701. Methods of notification to the printing apparatus 101 include two different notification methods, a push notification and a pull notification. When a session is maintained between the print service 102 and the printing apparatus 101, immediate notification through a push notification is possible.

On the other hand, when a session is not maintained and the printing apparatus 101 accesses the print service 102 on a periodical basis or at the time of event occurrence, a pull notification is possible. Upon reception of a notification, then in step S704, the printing apparatus 101 transmits a request for acquiring the print data included in the print job to the print service 102. In step S705, in response to this request, the print service 102 returns the print data to the printing apparatus 101. In step S706, the cloud print control unit 303 of the printing apparatus 101 transfers the received print data to the printing unit 304 to perform print processing. At this timing, the printing apparatus 101 which has received the notification may immediately transmit a data acquisition request to implement immediate printing or may transmit a data acquisition request upon the user's logging in to the printing apparatus 101. The print data acquired in step S705 may be the print data transmitted by the user terminal 103 in step S702. However, the print data of which the data format has been converted by the print service 102 is also applicable.

<Setting for Updating Client Certificate>

FIG. 8 illustrates examples of screens for setting a method for updating the client certificate of the printing apparatus 101. There are two different methods for updating the client certificate, MANUAL 801 and AUTOMATIC 802. When "MANUAL" is selected, the user can press the EXECUTE UPDATE button 811 at an arbitrary timing to issue an update instruction. When "AUTOMATIC" is selected, the user can set UPDATE TIMING 821 as the timing of update processing to be performed next time, INTERVAL OF FAILURE-TIME RETRANSMISSION 822 as the interval of retransmission if the update processing fails, and FAILURE-TIME NOTIFICATION METHOD 823 as a method for notifying the user of the failure. These setting items may be predetermined values in the printing apparatus 101 instead of being items settable by the user. The settings "MANUAL" and "AUTOMATIC" are exclusive settings of which the default selection is "MANUAL". The setting is based on a security concern that, if the default selection is "AUTOMATIC", the update operation requiring the administrator authority may be automatically performed in the background even when automatic update is not desired by the administrator. The setting may be settable by any user having the administrator authority, or may be settable only by the user who has first registered the printing apparatus 101 to the print service 102.

Figure 9:
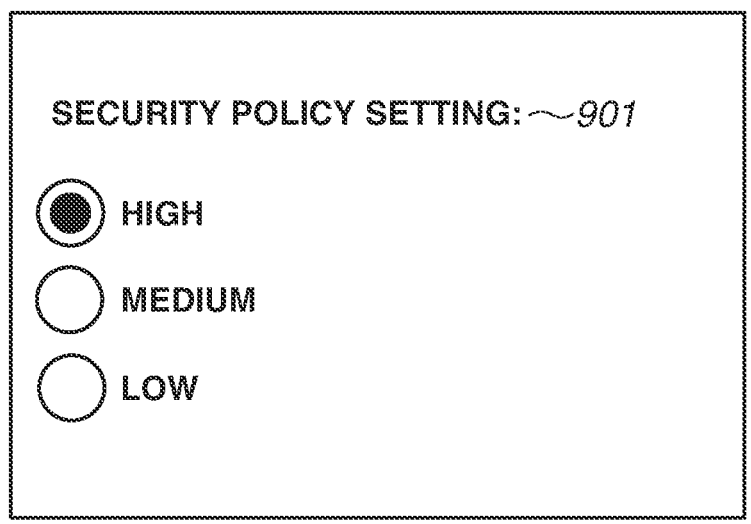
FIG. 9 illustrates a user interface for security policy setting included in the printing apparatus.

If the printing apparatus 101 has a security policy function as illustrated in FIG. 9, the setting may be limited in association with the security policy setting. The security policy setting guarantees security of the user terminal 103 by presetting a security rule for the user terminal 103. For the security policy, for example, the user can select one of three different security levels, "HIGH", "MEDIUM", and "LOW" which provide different security rules. Table 2 illustrates examples of combinations of the security policy setting with the password, encrypted communication, and administrator operation rules. These levels and rules may be preset in the user terminal 103, or desired levels and rules may be settable by the user.

TABLE 2

| Security policy setting | Password setting | Measure at password mismatching | Encrypted communication | Administrator operation |
|---|---|---|---|---|
| High | Ten (10) or more uppercase and lowercase alphanumeric characters | Locked out if mismatch occurs three times in succession | AES-based HTTPS is essential | Automatic execution of operations requiring administrator authority is not permitted |
| Medium | Eight (8) or more alphanumeric characters | Locked out for a predetermined period if mismatch occurs in three consecutive days | HTTPS is essential, but encryption algorithm does not matter | Automatic execution of operations requiring general user authority is not permitted |
| Low | Six (6) or more characters | None | HTTP is also applicable | None |

As an example of a prohibition setting, only "MANUAL" can be selected as the client certificate update setting when the security policy is set to "HIGH". The prohibition setting is intended to conform to a policy that, except for a case where the administrator performs a direct operation, an action requiring the administrator authority is not to be automatically performed. In this way, the update setting is made based on the security policy level, making it possible to more conveniently update the client certificate.

Referring to FIG. 8, RESULT OF LAST UPDATE 830 displays the result of the last update processing. More specifically, the RESULT OF LAST UPDATE 830 displays "SUCCESSFUL" and the date when the update processing succeeds or displays "FAILED", a response code, and a failure message when the update processing fails. The DATE OF NEXT UPDATE 831 displays the date when the update processing is to be performed next time when automatic update is set or displays nothing when manual update is set.

<Processing for Manually Updating Client Certificate>

The following describes processing for manually updating the client certificate according to embodiments of the present invention. After a user having the administrator authority logs in to the login screen displayed in the local UI 301 or the remote UI 302, the user displays the cloud print setting screen illustrated in FIG. 4 and changes the screen display to the screen illustrated in FIG. 8. When the registration processing of the printing apparatus 101 is successful, the EXECUTE UPDATE button 811 becomes selectable as illustrated in FIG. 8. The cloud print control unit 303 stores the user name included in the login account information about the user who has performed the registration processing illustrated in FIG. 5, in the HDD 204 as the registrant's user name. The EXECUTE UPDATE button 811 may be controlled such that it can be pressed only when the user name of the current login user coincides with the registrant's user name, or displayed in gray (disabled) when other users are currently logging in.

Figure 11:
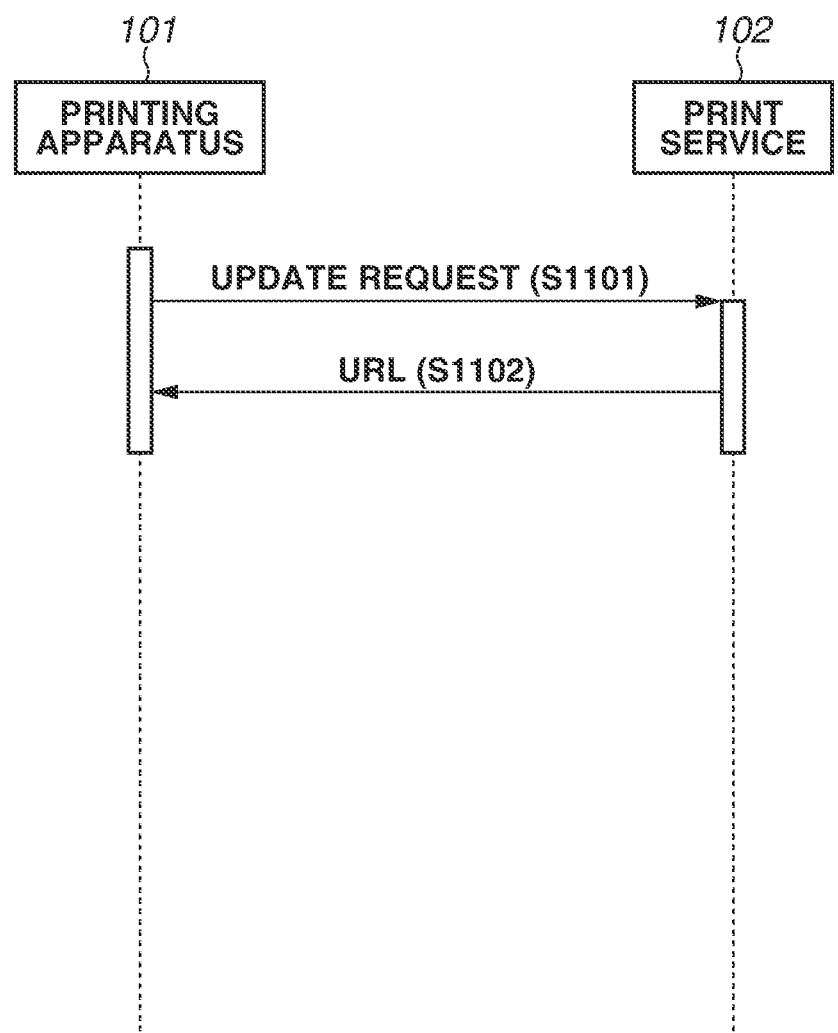
FIG. 11 illustrates a sequence for automatically updating the client certificate.

The following describes operations when the user presses the EXECUTE UPDATE button 811 illustrated in FIG. 8 in two different cases, with reference to the sequence diagram illustrated in FIGS. 10 and 11. In one case, the local UI 301 is used for processing for updating the client certificate by the printing apparatus 101. In the other case, the remote UI 302 is used for the update processing. In the sequence diagram illustrated in FIG. 10, the print service 102 has a function of updating the client certificate.

<Flow of Update from Local UI 301 Illustrated in FIG. 10>

In step S1001, the user presses the EXECUTE UPDATE button 811 in the cloud print setting screen (FIG. 8) displayed in the local UI 301 to issue an update instruction to the printing apparatus 101. Upon detection of the instruction, then in step S1002, the cloud print control unit 303 of the printing apparatus 101 generates a CSR and transmits an update request, together with the CSR, to the print service 102. In step S1003, the print service 102 generates a URL for updating the client certificate and returns the URL to the printing apparatus 101.

Figure 16:
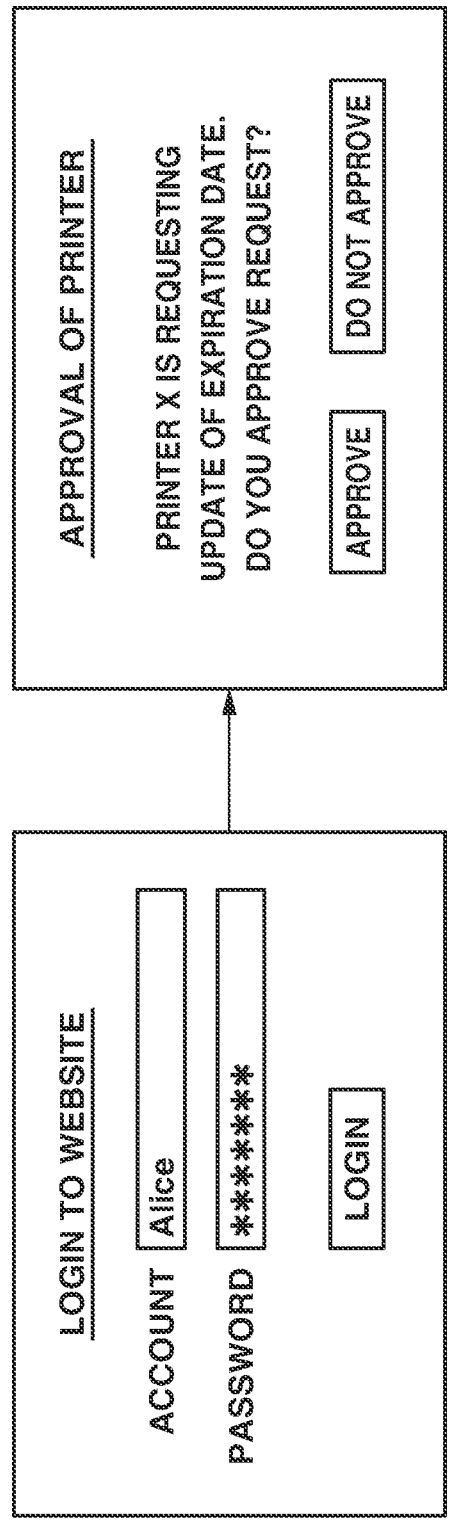
FIG. 16 illustrates a user interface of a print service for approving update.

The printing apparatus 101 displays the received URL in the local UT 301 and prompts the user to access the URL in order to update the printing apparatus registration. A QR code encoded from the URL may be displayed and read by a camera such as a smart phone. The printing unit 304 may be instructed to print the URL and QR code on paper. The user accesses the above-described URL by using the web browser of the user terminal 103. FIG. 16 illustrates an interface on the website when the user accesses the URL by using the web browser of the user terminal 103. When the user accesses the URL, the user is prompted to log in to the website. When the user inputs a login account of the website and logs in to the website, a user interface for requesting approval for update of the expiration date of the printing apparatus 101 appears.

In step S1004, the printing apparatus 101 periodically accesses the print service 102 to confirm the status of update approval. If update approval has been made in the user interface illustrated in FIG. 16, then in step S1005, the print service 102 returns the client certificate with the X509 format newly issued for the printing apparatus 101 to the printing apparatus 101. The printing apparatus 101 starts the confirmation of the status of update approval after step S1003 and repetitively performs the confirmation until the client certificate is successfully acquired, a notification that approval has been canceled is received from the print service 102, or a predetermined time period has elapsed.

When the client certificate is successfully received, the cloud print control unit 303 of the printing apparatus 101 updates the old client certificate to a new client certificate and stores the client certificate in the HDD 204. When displaying the user interface illustrated in FIG. 4, the local UI 301 acquires the expiration date described in the new client certificate and displays the expiration date as the expiration date 405 of the cloud print. The cloud print control unit 303 also instructs the local UI 301 to stop displaying a message for prompting the update processing currently displayed in the status line.

<Flow of Update from Remote UI 302 Illustrated in FIG. 10>

When the user uses the remote UI 302, the user logs in to the printing apparatus 101 from the remote UI 302 and displays the cloud print setting screen (FIG. 8) generated in HTML. In step S1011, the user displays the cloud print setting screen (FIG. 8) and presses the EXECUTE UPDATE button 811 to issue an update instruction.

Upon detection of the instruction, then in step S1012, the cloud print control unit 303 of the printing apparatus 101 generates a CSR and transmits an update request, together with the CSR, to the print service 102. In step S1013, the print service 102 generates a URL for updating the client certificate and returns the URL to the printing apparatus 101.

The printing apparatus 101 displays a link button for the received URL in the remote UI 302 and prompts the user to access the URL in order to update the printing apparatus registration. Instead of prompting the user to press the link button, the printing apparatus 101 may transmit a redirection request to the user terminal 103 so that the web browser of the user terminal 103 is redirected to the acquired URL. When the web browser of the user terminal 103 accesses the URL, the user is prompted to log in to the website. When the user inputs a login account of the website to log in to the website, a user interface for requesting approval for update of the expiration date of the printing apparatus 101 appears.

In step S1014, the printing apparatus 101 periodically accesses the print service 102 to confirm the status of update approval. If update approval has been made in the user interface illustrated in FIG. 16, then in step S1015, the print service 102 returns the client certificate with the X509 format newly issued for the printing apparatus 101 to the printing apparatus 101. The printing apparatus 101 starts the confirmation of the status of update approval after step S1013 and repetitively performs the confirmation until the client certificate is successfully acquired, a notification that approval has been canceled is received from the print service 102, or a predetermined time period has elapsed.

When the client certificate is successfully received, the cloud print control unit 303 of the printing apparatus 101 updates the old client certificate to a new client certificate and stores the client certificate in the HDD 204. When displaying the user interface illustrated in FIG. 4, the remote UI 302 acquires the expiration date described in the new client certificate and displays the expiration date as the expiration date 405 of the cloud print.

<Processing for Automatically Updating Client Certificate>

The following describes processing for automatically updating the client certificate according to embodiments of the present invention. When "AUTOMATIC" is selected as the method for updating the client certificate in the setting screen illustrated in FIG. 8, and the update time comes, then in step S1101, the cloud print control unit 303 of the printing apparatus 101 generates a CSR and transmits an update request, together with the user credential acquired in step S506 or S516, to the print service 102. The print service 102 determines whether the user credential acquired in step S1101 coincides with the user information having undergone the registration processing. When the print service 102 determines that the user credential coincides with the user information, the print service 102 successfully performs approval processing assuming that the update request in step S1101 has been approved by the registered user. In step S1102, the print service 102 returns the client certificate newly issued for the printing apparatus 101 to the printing apparatus 101.

When the client certificate is successfully received, the cloud print control unit 303 of the printing apparatus 101 updates the old client certificate to a new client certificate and stores the client certificate in the HDD 204. When displaying the user interface illustrated in FIG. 4, the remote UI 302 acquires the expiration date described in the new client certificate and displays the expiration date as the expiration date 405 of the cloud print.

On the other hand, when the print service 102 does not determine that the user credential acquired in step S1101 coincides with the user information having undergone the registration processing, the print service 102 returns a failure response to the printing apparatus 101. Upon reception of the failure response, the cloud print control unit 303 of the printing apparatus 101 displays the response code and the response message that have been returned, as illustrated in FIG. 8, to enable the user to recognize the cause of the error. If the failure-time retransmission setting is made, the printing apparatus 101 repeats the request processing from step S1101 when the retransmission time comes.

<Notification Processing when Automatic Update of Client Certificate has Failed>

The following describes a notification method to be used when automatic update of the client certificate fails according to embodiments of the present invention. If automatic update fails in the sequence illustrated in FIG. 11, the user is notified of an automatic update failure and details of the failure based on the setting screen illustrated in FIG. 8. Although there are some notification methods, the following describes a notification by the status line, a notification at the time of login, and a notification by mail.

Figure 12:
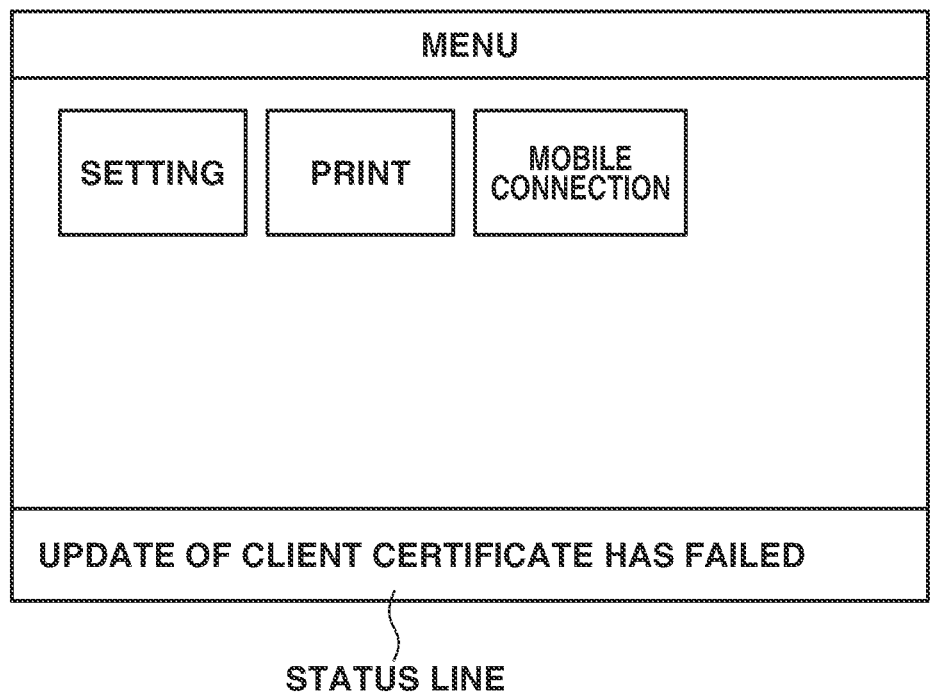
FIG. 12 illustrates an example of a status line screen when update fails.

FIG. 12 illustrates an example of a screen for notifying the user of a failure by using the status line. The bottom portion or the like of the local UI 301 where a message is displayed is referred to as a status line. The status line is an area adjacent to the area for selecting the functions of the printing apparatus 101 of the top screen of the local UI 301. The printing apparatus 101 has a function of notifying the user of "Print Sheet Ran Out", "Ink or Toner Ran Out", and "Paper Jam" by using the status line. If automatic update fails, the cloud print control unit 303 instructs the local UI 301 to display a message in the status line, indicating that automatic update of the client certificate has failed. As illustrated in FIG. 12, the local UI 301 displays a message in the status line according to an instruction.

Figure 13:
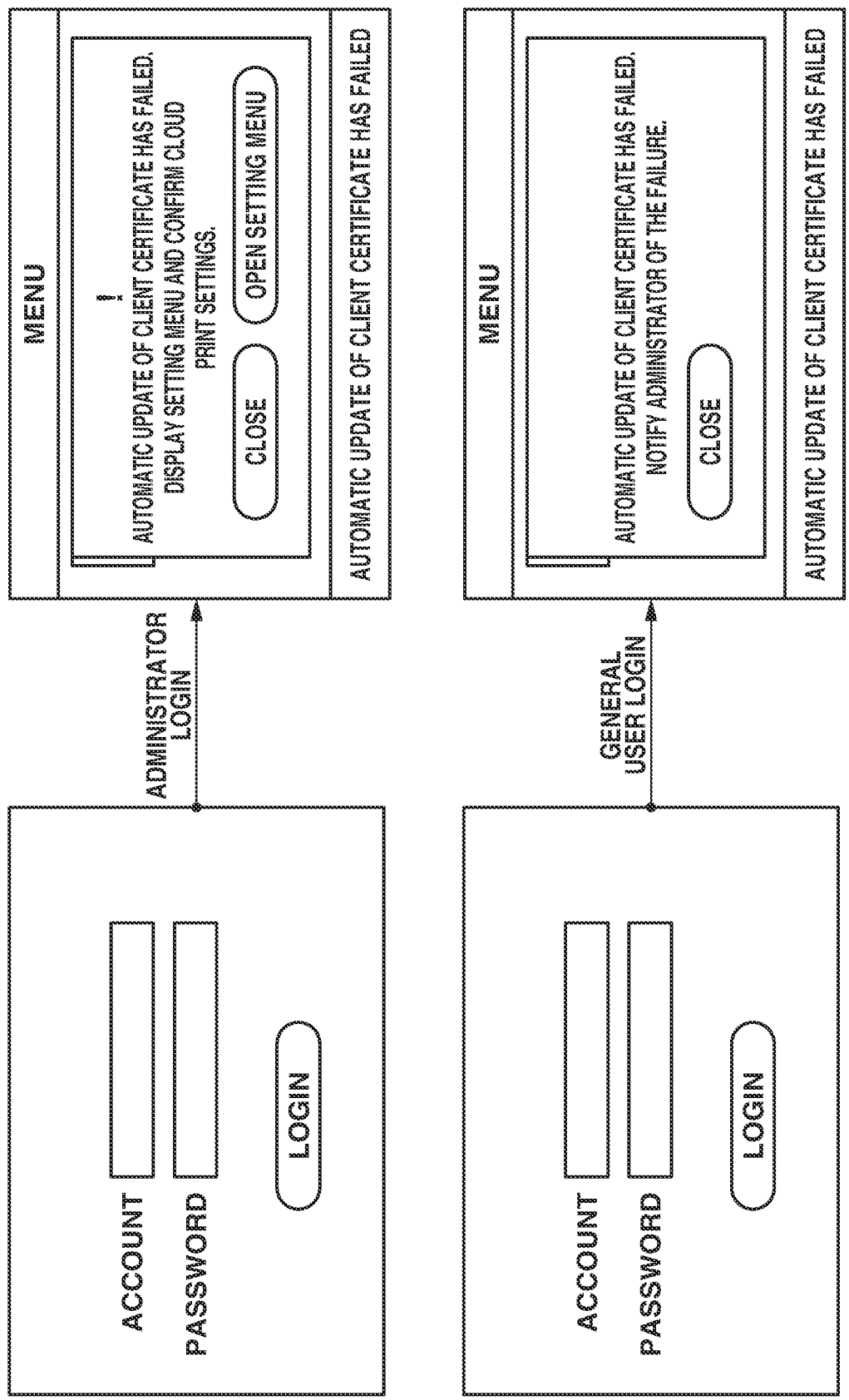
FIG. 13 illustrates examples of login screens when update fails.

FIG. 13 illustrates notification screens displayed at the time of login. When the user logs in to the printing apparatus 101 from the login screen of the local UI 301, the user authentication unit notifies the cloud print control unit 303 that the user has logged in to the local UI 301. The cloud print control unit 303 determines the role of the login user (administrator or general user) and instructs the local UI 301 to display a dialog based on the user's role. Dialog display is illustrated in FIG. 13. When the administrator logs in to the printing apparatus 101, the local UI 301 pops up a dialog and displays a message indicating that the settings will be reviewed since automatic update has failed. The dialog may display a button for displaying the cloud print setting screen (FIG. 4). When the button is pressed, the screen display is changed to the screen illustrated in FIG. 4. When a general user logs in to the printing apparatus 101, the local UI 301 displays a message for prompting the user to notify the administrator of the automatic update failure.

When the user logs in to the printing apparatus 101 from the login screen of the remote UI 302, the user authentication unit notifies the cloud print control unit 303 that the user has logged in to the remote UI 302. The cloud print control unit 303 determines the role of the login user (administrator or general user), generates a web page in HTML based on the user's role, and displays the web page on the web browser. When the administrator logs in to the printing apparatus 101, the remote UI 302 displays a web page including a message indicating that the settings will be reviewed since automatic update has failed. The web page may include a link button for displaying the HTML-based cloud print setting screen (FIG. 4) on the web page. When the link button is pressed, the screen display is changed to the screen illustrated in FIG. 4. When a general user logs in to the printing apparatus 101, the local UI 301 displays a message for prompting the user to notify the administrator of the automatic update failure. In any case, the screen display may be changed to the screen illustrated in FIG. 8.

FIG. 14 illustrates an example of a body text of a mail (when notification is made by mail). The printing apparatus 101 transmits a notification mail to the mail addresses of the owner of the printing apparatus 101 pre-registered in the printing apparatus 101 and the administrator to notify the owner and the administrator of the automatic update failure. An example of a notification mail is illustrated in FIG. 14. A text 1401 includes the printer name and the serial number as identification information for the printing apparatus 101. A text 1402 includes the expiration date. Texts 1403 to 1405 include procedures for updating the printing apparatus registration information. A text 1404 includes the URL of the website of the printing apparatus 101 having an update function. A text 1405 includes the URL of the print service 102 having an update function.

When the URL in the text 1404 is clicked, the web browser is activated on the user terminal 103 on which the mail has been opened, and the remote UI 302 displays a login screen on the web browser. When the user logs in to the printing apparatus 101, the remote UI 302 displays the HTML-based cloud print setting screen (FIG. 8). The user can instruct the printing apparatus 101 to perform the update processing by pressing the EXECUTE UPDATE button 811 on the cloud print setting screen. The URL in the text 1404 may be an URL for displaying the setting screen illustrated in FIG. 4.

When the URL in the text 1405 is clicked, the web browser is activated on the user terminal 103, and the remote UI 302 accesses the website provided by the print service 102. After performing the login operation in the login screen of the website, the user displays a printer list screen (FIG. 15) managed by the user and presses an UPDATE button 1501 to enable instructing the printing apparatus 101 to perform the update processing. When the UPDATE button 1501 is pressed, the print service 102 transmits the client certificate generated for update to the printing apparatus 101. Alternatively, the print service 102 may store the generated client certificate inside the print service 102, and the user may acquire the client certificate at any timing by selecting a DOWNLOAD CERTIFICATE button. The user may update the client certificate by installing the downloaded client certificate stored in the user terminal 103, in the printing apparatus 101 via the remote UI 302 of the printing apparatus 101.

The print service 102 may transmit a similar notification mail to the mail addresses of the owner of the printing apparatus 101 and the administrator. In this case, when registering the printing apparatus 101 to the cloud service, the user registers a part or all of notification information (identification information for the printing apparatus 101, procedures for updating the printing apparatus 101, and the URL of the remote UI of the printing apparatus 101 having an update method) to the cloud service.

As described above, according to the present exemplary embodiment, the printing apparatus 101 stores the user credential and the client certificate as a device credential of the printing apparatus 101. When the expiration date comes close, the printing apparatus 101 automatically performs processing for updating the client certificate based on the above-described information, making it possible to reduce the time and effort required by the user to update the printing apparatus registration information.

A second exemplary embodiment will be described below centering on the update processing in a case where the print service 102 is not provided with a function of updating the client certificate. In this case, the print service 102 has a function of issuing a client certificate only at the time of printer registration, and does not assume update of the client certificate while the printing apparatus 101 is being registered. Although the print service 102 has been described above as one service, the system illustrated in FIG. 1 may include a plurality of print services 102. In addition, the printing apparatus 101 can cooperate with a plurality of print services 102. When the printing apparatus 101 determines that it cooperates with the print service 102 not having a function of updating the client certificate, the client certificate will be updated by a method for re-registering the printing apparatus 101 (described below). The printing apparatus 101 determines whether the print service 102 has a function of updating the client certificate and updates the client certificate with the update method according to the first exemplary embodiment or an update method to be described below. The printing apparatus 101 may also update the client certificate only with an update method according to the second exemplary embodiment.

<Flow of Manual Update from Local UI 301 Illustrated in FIG. 17>

In step S1701, the user presses the EXECUTE UPDATE button 811 of the cloud print setting screen (FIG. 8) displayed in the local UI 301 to issue an update instruction. In step S1701, the user presses the EXECUTE UPDATE button 811 to issue an update instruction. Upon detection of the update instruction, then in step S1702, the cloud print control unit 303 of the printing apparatus 101 transmits a request for canceling the printer registration to the print service 102. In step S1703, the printing apparatus 101 receives a response from the print service 102. In step S1704, the printing apparatus 101 generates a CSR and transmit a registration request, together with the CSR, to the print service 102. The sequence from steps S1704 to step S1707 is similar to the sequence from step S502 to step S505 illustrated in FIG. 5.

The cloud print control unit 303 of the printing apparatus 101 that has received a new client certificate in step S1706 updates the old client certificate with the new client certificate and stores the client certificate in the HDD 204. When displaying the user interface illustrated in FIG. 4, the local UI 301 acquires the expiration date described in the new client certificate and displays the expiration date as the expiration date 405 of the cloud print. The cloud print control unit 303 instructs the local UI 301 to stop display of the message for prompting to perform the update processing currently displayed in the status line.

<Flow of Manual Update from Remote UI 302 Illustrated in FIG. 17>

When the user uses the remote UI 302, the user logs in to the printing apparatus 101 from the remote UI 302, displays the cloud print setting screen (FIG. 4) generated in HTML, and changes the screen display to the screens illustrated in FIG. 8. In step S1711, the user displays the cloud print setting screen (FIG. 8) and presses the EXECUTE UPDATE button 811 to issue an update instruction. Upon detection of the update instruction, then in step S1712, the cloud print control unit 303 of the printing apparatus 101 transmits a request for canceling the printer registration to the print service 102. In step S1713, the printing apparatus 101 receives a response from the print service 102. In step S1714, the printing apparatus 101 generate a CSR and transmits a registration request, together with the CSR, to the print service 102. The sequence from step S1714 to step S1717 is similar to the sequence from step S502 to step S505 illustrated in FIG. 5.

The cloud print control unit 303 of the printing apparatus 101 that has received a new client certificate in step S1706 updates the old client certificate with the new client certificate and stores the client certificate in the HDD 204. When displaying the user interface illustrated in FIG. 4, the remote UI 302 acquires the expiration date described in the new client certificate and displays the expiration date as the expiration date 405 of the cloud print.

Figure 18:
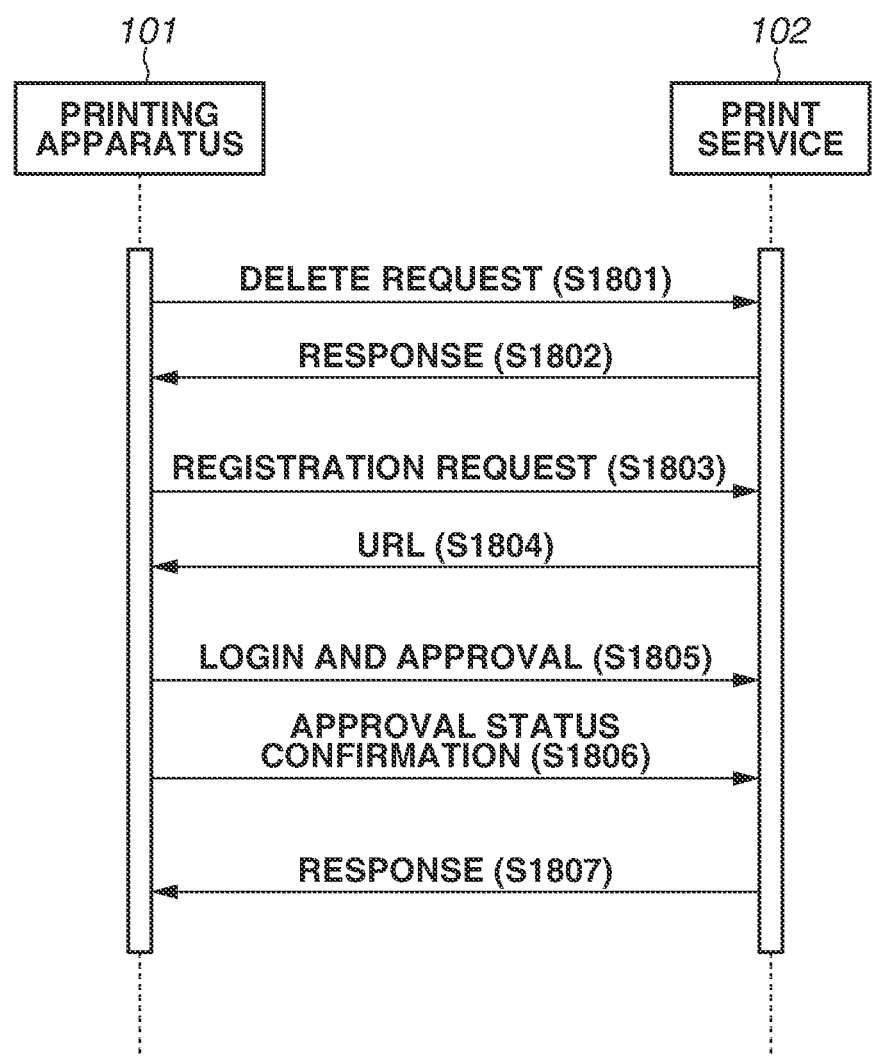
FIG. 18 illustrates a sequence for automatically updating the client certificate according to the second exemplary embodiment.

<Flow of Automatic Update Illustrated in FIG. 18>

Figure 5:
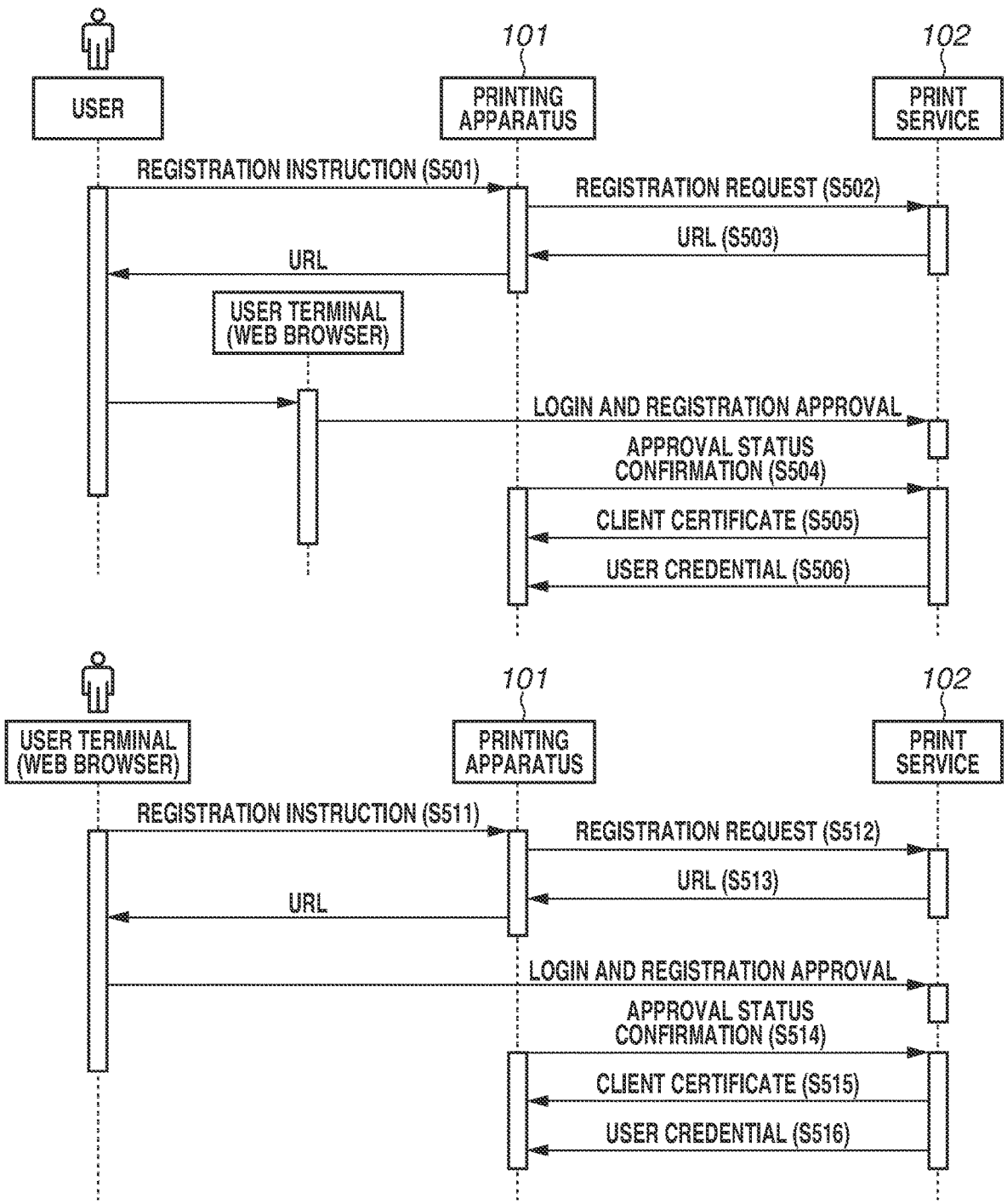
FIG. 5 illustrates a sequence for registering the printing apparatus to a print service.
Figure 19:
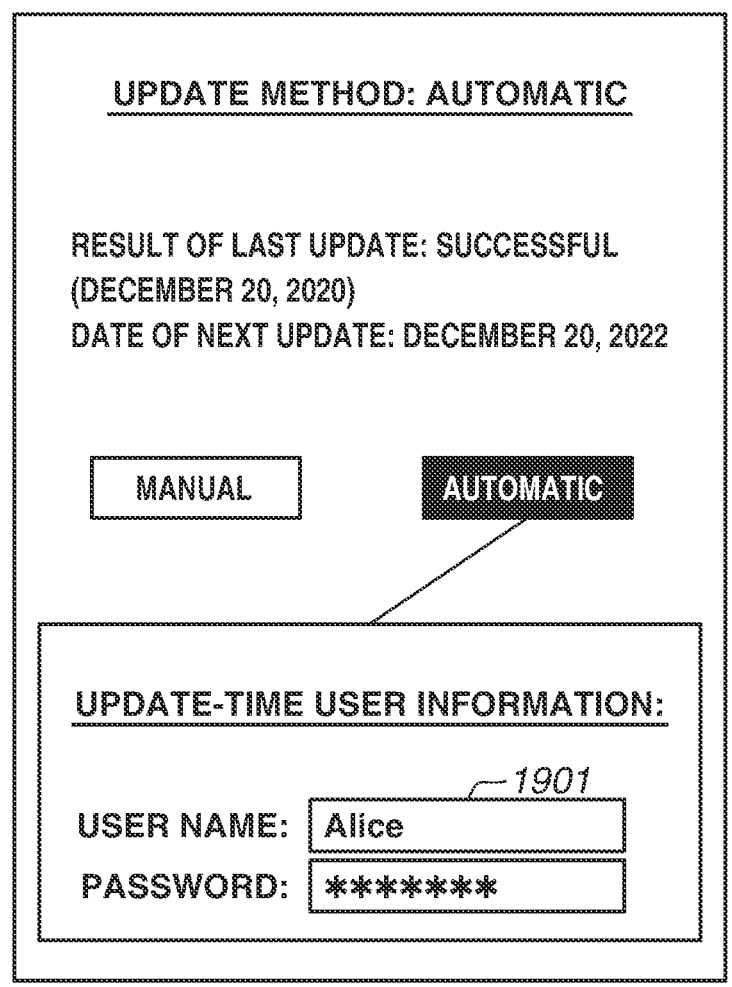
FIG. 19 illustrates a user interface for automatic update setting included in the printing apparatus according to the second exemplary embodiment.

Since the print service 102 does not mount the update function, it is not necessary to use the user credential used in FIG. 5. Therefore, the user credential is not transmitted to the printing apparatus 101. To enable automatic update even in such a case, the printing apparatus 101 provides the user with a screen for setting a user name and a password to be used at the time of automatic update as illustrated in FIG. 19. Although, for the setting item, it is desirable to set the same user information as the user who has registered the printing apparatus 101, user information about a user having another administrator authority may be set. The user name and password of the user who has logged in to the printing apparatus 101 when the printing apparatus 101 has been registered may be automatically memorized and automatically stored in the setting item.

FIG. 18 is a sequence diagram illustrating automatic update according to the present exemplary embodiment. When the time for performing automatic update comes, then in step S1801, the cloud print control unit 303 of the printing apparatus 101 transmits a request for canceling the printer registration to the print service 102. In step S1802, the printing apparatus 101 receives a response from the print service 102. In step S1803, the printing apparatus 101 generates a CSR and transmits a registration request, together with the CSR, to the print service 102. In step S1804, the printing apparatus 101 receives URL information from the print service 102 and activates a built-in web browser (not illustrated) of the printing apparatus 101. In step S1805, the printing apparatus 101 accesses the URL received by the activated built-in web browser, logs in to the print service 102 by using the user name and password set in the screen illustrated in FIG. 19, and automatically performs processing up to the approval processing. The sequence from step S1806 to step S1807 is equivalent to the sequence from step S504 to step S505 illustrated in FIG. 5.

As described above, according to the second exemplary embodiment, even in a case where the print service 102 does not have a function of updating the client certificate, the printing apparatus 101 can perform processing for automatically updating the client certificate, making it possible to reduce the time and effort required by the user to update the printing apparatus registration information.

OTHER EMBODIMENTS

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-100074, filed May 24, 2018, which is hereby incorporated by reference herein in its entirety.

What is claimed is:

1. A printing apparatus for performing printing upon reception of print data from a print service for providing a service via the Internet, the printing apparatus comprising:
   one or more processors; and
   at least one memory coupled to the one or more processors and having stored thereon instructions, which when executed by the one or more processors, cause the printing apparatus to:
      acquire a client certificate of the printing apparatus issued by the print service in accordance with registering the printing apparatus upon transmission of a request for registering the printing apparatus to the print service, and a user credential of a user who has issued an instruction for registering the printing apparatus;
   transmit the client certificate to the print service, receive the print data, and perform a printing process;

based on an expiration date described in the client certificate, transmit an update request for updating the client certificate to the print service by using the user credential; and receive a client certificate newly issued in a case where the update request is transmitted and the user credential is successfully verified by the print service, and utilize the newly issued client certificate.

2. The printing apparatus according to claim 1, wherein the instructions, when executed by the one or more processors, further cause the printing apparatus to:

in a case where the client certificate is determined to be scheduled to be invalidated in a case where the expiration date described in the client certificate expires, notify updating the client certificate, wherein, based on a manual update instruction from the user, the printing apparatus transmits a request for updating the client certificate to the print service.

3. The printing apparatus according to claim 1, wherein an expiration date of the newly issued client certificate is longer than the expiration date of the client certificate.

4. The printing apparatus according to claim 1, wherein, in a case where update processing fails, the printing apparatus notifies the user of the failure.

5. The printing apparatus according to claim 1, wherein the instructions, when executed by the one or more processors, further cause the printing apparatus to:

set whether the client certificate is to be updated, by using either one of an update method based on a manual update instruction from the user and an update method automatically performed by the printing apparatus without requiring an instruction from the user.

6. The printing apparatus according to claim 5, wherein the instructions, when executed by the one or more processors, further cause the printing apparatus to:

set a security policy for the printing apparatus, wherein, in a case where the security policy is set, either one of the update method automatically performed and the update method based on a manual update instruction is set based on a security level of the set security policy.

7. The printing apparatus according to claim 5, wherein, based on the update method selected by the user, either one of the update method automatically performed and the update method based on a manual update instruction is set.

8. The printing apparatus according to claim 5, wherein, in a case where the automatic update method fails, a content describing the manual update method is notified.

9. The printing apparatus according to claim 8, wherein the content describing the manual update method includes at least one of a link for having a first HyperText Markup Language (HTML) format screen for receiving a manual update instruction from the user provided from a function of a remote user interface (UI) of the printing apparatus, and a link for having a second HTML format screen for receiving a manual update instruction from the user provided from the print service.

10. A method for a printing apparatus for performing printing upon reception of print data from a print service for providing a service via the Internet, the method comprising:

acquiring a client certificate of the printing apparatus issued by the print service in accordance with registering the printing apparatus upon transmission of a request for registering the printing apparatus to the print service, and a user credential of a user who has issued an instruction for registering the printing apparatus;

transmitting the client certificate to the print service, receiving the print data, and performing a printing process;

based on an expiration date described in the client certificate, transmitting an update request for updating the client certificate to the print service by using the user credential; and receiving a client certificate newly issued in a case where the update request is transmitted and the user credential is successfully verified by the print service, and utilizing the newly issued client certificate.

11. A non-transitory computer-readable storage medium storing a program for a printing apparatus for performing printing upon reception of print data from a print service for providing a service via the Internet, the program comprising instructions that, when executed by one or more processors of the printing apparatus, cause the printing apparatus to perform operations comprising:

acquiring a client certificate of the printing apparatus issued by the print service in accordance with registering the printing apparatus upon transmission of a request for registering the printing apparatus to the print service, and a user credential of a user who has issued an instruction for registering the printing apparatus;

transmitting the client certificate to the print service, receiving the print data, and performing a printing process;

based on an expiration date described in the client certificate, transmitting an update request for updating the client certificate to the print service by using the user credential; and receiving a client certificate newly issued in a case where the update request is transmitted and the user credential is successfully verified by the print service, and utilizing the newly issued client certificate.

* * * * *